United States Patent
Lisec et al.

(10) Patent No.: US 6,748,804 B1
(45) Date of Patent: Jun. 15, 2004

(54) MICROSENSOR FOR MEASURING THE POSITION OF LIQUIDS IN CAPILLARIES

(75) Inventors: Thomas Lisec, Itzehoe (DE); Bernd Wagner, Looft (DE); Hans Joachim Quenzer, Itzehoe (DE)

(73) Assignee: Fraunhofer-Gesellschaft zur Foerderung der Angeandten Forschung E.V., Munich (DE)

( * ) Notice: Subject to any disclaimer, the term of this patent is extended or adjusted under 35 U.S.C. 154(b) by 0 days.

(21) Appl. No.: 10/088,200

(22) PCT Filed: Aug. 3, 2000

(86) PCT No.: PCT/DE00/02609

§ 371 (c)(1),
(2), (4) Date: Jul. 22, 2002

(87) PCT Pub. No.: WO01/20271

PCT Pub. Date: Mar. 22, 2001

(30) Foreign Application Priority Data

Sep. 15, 1999 (DE) .......................... 199 44 331

(51) Int. Cl.⁷ .............................................. G01F 23/00
(52) U.S. Cl. .................................. 73/304 R; 73/290 R
(58) Field of Search ........................ 73/304 R, 290 R

(56) References Cited

U.S. PATENT DOCUMENTS

| | | | | |
|---|---|---|---|---|
| 4,169,377 A | * | 10/1979 | Scheib ...................... 73/304 R |
| 4,801,865 A | * | 1/1989 | Miller et al. ............... 324/65 R |
| 5,138,880 A | | 8/1992 | Lee et al. .................. 73/304 C |
| 5,146,785 A | | 9/1992 | Riley ......................... 73/313 |
| 5,148,708 A | * | 9/1992 | Murata et al. ............. 73/304 R |
| 5,719,556 A | | 2/1998 | Albin et al. ................ 340/618 |
| 6,212,956 B1 | * | 4/2001 | Donald et al. ............... 73/724 |

FOREIGN PATENT DOCUMENTS

| | | | |
|---|---|---|---|
| DE | 4114934 | 9/1992 | |
| DE | 19548219 | 6/1997 | |
| DE | 19644777 | 6/1998 | |
| DE | 19644777 C1 * | 6/1998 | ........... G01F/23/26 |
| EP | 0404479 | 12/1990 | |
| FR | 2638521 | 5/1990 | |

OTHER PUBLICATIONS

Ferry N. Toth, et al., "A Planar Capacitive Precision Gauge for Liquid-Level and Leakage Detection" IEEE Transactions on Instruments and Measurements, vol. 46, No. 2, Apr. 1997.

Marco J. Daoura, et al., "Precise Automated Control of Fluid Volumes Inside Glass Capillaries" IEEE Journal of Microelectromechanical Systems, vol. 8, No. 1, Mar. 1999.

* cited by examiner

Primary Examiner—Herzon Williams
Assistant Examiner—Rodney Frank
(74) Attorney, Agent, or Firm—Crowell & Moring LLP

(57) ABSTRACT

A sensor element for electrically measuring the position of liquid levels, comprising a substrate (2) and a plurality of electrodes (3) that can be contacted individually and that are mounted on the substrate, characterized in that the electrodes comprise sensor-active partial electrodes (5) that are networked with electrical connections (7), with the partial electrodes of two respective electrodes always being positioned opposite one another, separated by a distance, as partial electrode pairs (11) and with the electrode pairs (8) thus formed recurring periodically over the length of the sensor. Quasi-digital measuring methods are derived from the behavior of the impedance of the electrode pairs, whereby the liquid level is measured by detecting a conductivity boundary in a capillary filling.

19 Claims, 3 Drawing Sheets

MICROSENSOR FOR MEASURING THE POSITION OF LIQUIDS IN CAPILLARIES

This application claims the priority of German Application No. 199 44 331.5, filed, Sep. 15, 1999 and International Application No. PCT/DE00/02609, filed Aug. 3, 2000, the disclosures of which are expressly incorporated by reference herein.

BACKGROUND AND SUMMARY OF THE INVENTION

The invention relates to a microsensor for measuring the position of liquids in capillaries which is particularly well suited for use in automated pipetting dispensers in medical laboratories and in the pharmaceutical industry.

In the analysis of clinical profiles or routine health checks, modem medicine increasingly relies on the quantitative determination of relevant substances in bodily fluids. The number of substances to be monitored is constantly growing, as is likewise the frequency of testing. Performing greater numbers of analyses while simultaneously lowering costs primarily requires a decrease in the use of reagents, which are often very costly. The tendency toward precise metering of the smallest possible quantities of liquids, with a volumetric range of 0.1 to 20 $\mu L$, is therefore a key objective.

In the metering operation, defined quantities of samples and reagents from starting containers must be distributed onto microtiter plates having many individual reaction receptacles (wells). A conventional plastic microtiter plate contains 96 wells, for example, each with a volume of 500 $\mu L$, in a 9-mm grid. Modern pipetting systems can meter between one and several hundred $\mu L$ of a liquid, using stepping motor-driven injection pumps, with a piston injection precision of several percent. Typically, eight separately controllable pipettes are arranged in parallel, with the result that a microtiter plate must be filled in several passes. The throughput is therefore limited, which affects the measuring results in kinetic tests. Devices currently exist which contain 96 pipettes. However, such devices are not separately controllable; that is, with each metering operation the same quantity is dispensed to all the pipettes. In many applications, separate control of the pipettes would be preferable. In order to meter quantities of liquids from 0.1 to 20 $\mu L$ with greater precision in an array of separately controllable pipettes, the metering operation must be actively monitored at each individual pipette.

In the course of a quantitative analysis, samples and reagents are successively pipetted into the appropriate wells of the microtiter plate, using an injection pump via a liquid column. The operating liquid is typically separated from the sample or reagent by an air bubble to avoid contamination. After the reactions have taken place in the wells, the concentration of one of the reaction products is photometrically determined, and the concentration of the sample component being sought is calculated therefrom.

The sample volume dispensed during a pipetting operation results from the piston feed from the injection pump. However, the sample volume is defined in the same manner both before and after the metering operation by the filling level of the sample liquid in the pipette.

Filling level sensors for monitoring liquids in reservoirs or tanks have been known for quite some time. In addition to sensors that are based on floats, there are a number of systems with no moving parts. Such systems are based, for example, on optical or electrical measurement techniques.

U.S. Pat. No. 5,138,880 describes a capacitive sensor comprising two concentric cylinders which are submerged in a dielectric medium along the measurement axis. The cylinders are divided into a number of discrete condensers. The capacitance of each individual condenser depends on whether air or the medium to be monitored is present between the electrodes. By comparison of the capacitances, the filling height of the medium in the container may be quasi-digitally determined with a precision corresponding to the number of measurement segments. The capacitive measurement principle can also be employed in the form of a planar sensor. This type of sensor must be calibrated for each liquid.

The filling level may be potentiometrically determined in conductive liquids. A rod-shaped resistor, which is vertically submerged in the liquid and together with this liquid forms the resistors of a bridge circuit, may serve as the measuring probe. The voltage drop at the resistor, measured via the liquid, is proportional to the liquid level. An example of such is disclosed in U.S. Pat. No. 5,146,785. Here, the measuring probe is additionally divided into a series of individual resistors, thus generating a stair-step, quasi-digital output signal.

A further electrical sensor principle is based on conductivity measurements. To this end, an alternating current in the kHz range is applied between two respective electrodes, and the current between the electrode pairs is measured. An example of such is disclosed in U.S. Pat. No. 5,719,556.

The electrical devices for measuring liquid levels according to the current art are not suited for measuring the position of liquids in capillaries. The use of said devices is limited to the measurement of filling levels in tanks, for example.

The object of the invention is to provide a device and a method for operating said device for electrically measuring the position of liquid levels in capillaries, particularly in metering devices, which is cost-effective to produce and which operates reliably and precisely.

The microsensor for measuring the position of liquids in capillaries according to the invention is based on the principle of conductivity measurements. However, only a change in the conductivity is essential to the measurement principle. The absolute value of the conductivity of the operating liquid plays a minor role.

Contained in the capillary is a gas bubble which is enclosed on both sides by the operating solution and which can be moved back and forth within the capillary by means of a sensor chip. A nonconductive liquid which is immiscible with the operating solution may be used instead of the gas bubble. The following description relates only to a bubble, without limiting the universality. It is essential that a significant difference in conductivity exists between the operating liquid and the contents of the bubble. It is also conceivable, therefore, that the operating liquid is nonconductive and the bubble is composed of a conductive liquid. Thus, there is at least one boundary between two different conductivities of the capillary filling in the region above the sensor element.

The sensor chip comprises a substrate preferably made of silicon, glass, or plastic. Microstructured, partially passivated metal electrodes preferably made of platinum, iridium, or gold are mounted on the sensor chip. Iridium is characterized by an especially low polarization resistance in aqueous solution. The electrodes each comprise a preferably constant number of partial electrodes which are separated by a preferably constant distance from one another and which are networked with electrical connections. The partial electrodes of preferably two electrodes are positioned pairwise opposite one another, separated preferably by a constant distance, as partial electrode pairs. The recurring basic geometry (meander) thus comprises preferably two electrode pairs, which in turn comprise partial electrode pairs. This basic geometry repeats itself periodically over the entire length of the sensor chip. The distance between the partial electrode pairs in the longitudinal direction, that is, in the direction of the bubble motion to be measured, is always the same. This also applies to adjacent partial electrode pairs which form part of adjacent meanders.

The electrical connections between the partial electrodes of the electrodes are preferably coated with a passivating layer, whereas the partial electrodes themselves represent the sensor-active regions of the sensor chip and thus are situated directly on the surface, which comes into contact with the operating liquid. The sensor is mounted laterally on the capillary, which is made of glass or plastic, for example, in such a way that the active regions of the electrodes, and thus of the partial electrodes, are located in the interior of the capillary. In contrast, the connections (bondpads) of the electrodes of individual meanders are situated outside the capillary. To this end, the capillary wall is partially replaced by the sensor chip. When a conductive liquid is present in the capillary and a voltage is applied thereto, a current flows between the oppositely situated partial electrodes of a meander. The impedance of the meander is determined by the wetted electrode area, that is, the number of wetted partial electrode pairs. The impedance decreases with an increasingly wetted area. This effect can be used to advantage in detecting the position of an air bubble, or a conductivity boundary in general, which completely or partially covers the meander, or, in the case of a single conductivity boundary, which is located above the meander. The following discussion relates to a description of the operating mode of the sensor with regard to a bubble, without limiting the universality. Moreover, the discussion is also valid for the presence of a single conductivity boundary. Hence, it is not a bubble position that is determined, but rather, the location of the conductivity boundary between two partial electrode pairs of a meander, or the location of the conductivity boundary between two meanders. A bubble represents a special case in which two conductivity boundaries are present in the capillary filling.

The position of the bubble may be determined by comparing resistance values of all meanders in the idle state. Regardless of the specific operating liquid, all the meanders wetted by the liquid have the same minimum resistance. When the bubble is large enough to completely cover at least one meander, this results in a maximum resistance value for this meander. The adjoining meanders, which are only partially covered, have intermediate resistance values. To determine the exact position of the liquid surface in the intermediate region of a meander, it is necessary to know the shape of the resistance curve (reference resistance curve) for a coated meander as well as the minimum and maximum resistance of the affected meander. By interpolating on the curve of a known shape and with the known minimum and maximum values, any intermediate resistance value can then be assigned to a specific partial electrode pair of the corresponding meander, and the position of the bubble or of the conductivity boundary can thus be precisely determined.

If the wetting properties of the operating liquid with respect to the sensor element are such that no permanent liquid film forms on the sensor element, and if the migration velocity of the bubble is not too high, characteristic abrupt changes in the resistance (jumps) occur during the movement of the bubble over the partial electrode pairs of a meander. In the case of an aqueous solution, this signifies a hydrophobic surface on the sensor element; however, the solution must not be repelled so strongly that no wetting can take place in the regions of the sensor element that are covered by the operating liquid. Ideally, the sensor element is always wetted by the operating liquid in the exact location where it is covered by the operating liquid level. If all meanders are monitored in parallel, the path distance traveled by the bubble, and thus the displaced liquid volume, can be determined from the total number of jumps during migration of the bubble.

Two possible methods for detecting the position of the bubble can be derived from the behavior of the impedance of the meander:

In the dynamic method (incremental measurement), the resistance between the electrode pairs of all meanders of the filling level sensor is determined in parallel with many measured values per unit time (high sampling rate). In this manner, the number of jumps occurring during the movement of the bubble can be counted. Since the distance between the partial electrode pairs in the longitudinal direction is known, the path length traveled by the bubble in the capillary may be determined, and from this value, together with the cross section of the capillary, the displaced liquid volume may be determined. This measurement technique is quasi-digital in nature. The resistance curve is qualitatively evaluated, and the absolute value of the resistance is not used in the evaluation. The conductivity of the operating liquid, which is influenced by a number of factors such as the ion concentration and mobility as well as the temperature, plays a minor role in the measurement result. The conductivity need only be high enough to allow the jumps to be detected.

In the static method (absolute measurement), the resistance between the electrode pairs of the meanders is measured in the idle state. All meanders that are completely covered by the liquid present in the capillary have a minimum resistance value. If one of the meanders is completely covered by the bubble, said meander has a maximum resistance value. If the adjoining meanders are only partially covered by the bubble, intermediate values appear. When the resistance is qualitatively known (reference resistance curve) as a function of the number of partial electrode pairs (short-circuited partial electrodes) of a meander covered by liquid, and the minimum and maximum values are available, the position of the bubble front over the corresponding meander can be obtained by interpolation of the intermediate values. The displaced liquid volume is again obtained from the distance traveled by the bubble. If the liquid film below the bubble tears cleanly so that all partial electrode pairs that are covered by the bubble are uncovered, the maximum resistance of the meander that is completely covered by the air bubble is a constant value, independent of the properties of the operating solution or liquid. Since the minimum resistance of a meander that is completely covered by liquid can be redetermined at any time, there is an option for in situ calibration, which is understood to mean calibration performed during operation. However, it is preferable for the same liquid to be present on both sides of the bubble. Here as well, the measuring technique is independent of the conductivity of the operating solution, provided that this conductivity exceeds the minimum value required for measurement.

A significant advantage of the static, as opposed to the dynamic, measurement method is that the position of the bubble is precisely determined both before and after the metering operation.

Operations can therefore be performed when high bubble migration velocities are present, since the occurrence of jumps is not important for the measurement. In the dynamic measurement method, the migration velocity of the bubble is limited by the wetting properties of the operating liquid.

In a preferred embodiment, the meanders are divided into not substantially more than 10 partial electrode pairs. If this number is significantly exceeded, the jumps in conductivity become increasingly difficult to distinguish from one another, especially when the dynamic measurement method is used. This represents a major advantage of the periodic electrode structure, in addition to the possibility for detecting the bubble position for exactly one meander.

With regard to bubble size, the bubble should be able to completely cover at least one meander, particularly for the static measurement method. The length of the bubble is preferably twice the length of a meander, thereby ensuring that there is always a meander that is completely covered by the bubble.

Errors, such as plugging of the capillary, are known in both methods.

The resolution of the sensor is determined by the number of meanders per unit length of sensor chip and the number of partial electrode pairs per meander. The distance between the partial electrode pairs in the longitudinal direction and the cross section of the capillary define the minimum detectable output or intake of liquid volume.

When a direct current is supplied to the meanders, undesirable electrochemical effects in the operating liquid may occur at the electrodes. Therefore, alternating current in the kilohertz range is preferably applied to the electrodes. For the conductivity measurement, an alternating current ranging up to 100 millivolts is applied and the resulting current is measured as the output signal.

The sensor chip according to the invention is characterized by particularly cost-effective production. In addition, the sensor chip allows the position of the liquid surface to be easily and precisely measured. The sensor according to the invention enables the liquid level in capillaries to be electrically measured, which is particularly advantageous in the pipetting of liquids. Furthermore, the measurement of the position of the conductivity boundaries can be used to determine differential pressures, similar to the classic manometer in which the pressure differential creates a difference in levels between the two arms of a U-shaped tube. The capillary in this case corresponds to the tube. In general, the sensor according to the invention can detect the motion of various liquids in a fluid system in which the liquids are being processed and/or analyzed.

BRIEF DESCRIPTION OF THE DRAWINGS

The present invention is described hereinafter in more detail, based on embodiment examples and with reference to the drawings, without limiting the general concept of the invention.

DETAILED DESCRIPTION OF THE PREFERRED EMBODIMENTS

Figures 1, 2:
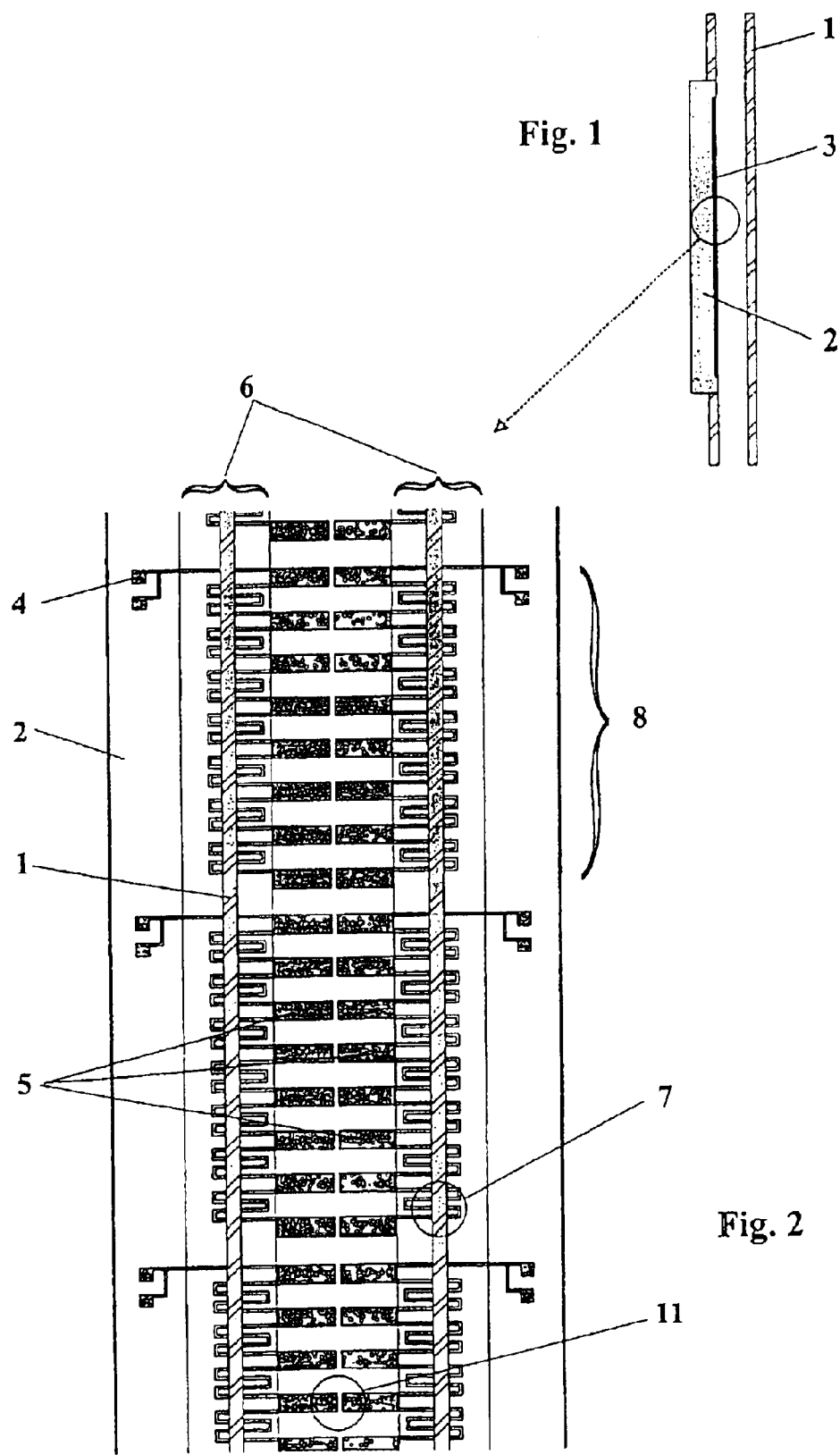
FIG. 1 schematically shows the cross section through a capillary (1) with a laterally mounted sensor chip (2) which has microstructured metal electrodes (3).
FIG. 2 shows a section of a sensor according to the invention with a possible electrode geometry in a top view.

FIG. 1 shows a schematic cross section through a capillary (1) made of glass, for example, with a laterally mounted sensor chip (2) having microstructured metal electrodes (3), which represents the preferred design for a pipette with a filling level sensor. The sensor chip preferably comprises a silicon substrate on which platinum electrodes are mounted.

FIG. 2 shows a section of a sensor according to the invention with a possible electrode geometry in a top view. The active, uncovered regions (5) of the electrodes are located inside the capillary (1) and are distributed over the entire length of the chip. The electrode structure is defined by a continuously recurring configuration. Each electrode comprises a plurality of sensor-active partial electrodes (5), with an electrode pair (meander) (8) always being formed by two electrodes The partial electrodes of the electrode pairs are positioned opposite one another as partial electrode pairs (11). Each electrode has its own electrical connection option (bondpad) (4). Successive meanders are configured so that the distance between the partial electrode pairs (11) is always constant over the entire length of the chip. Each meander comprises two metal electrodes having eight partial electrode pairs which are positioned opposite one another. The individual partial electrodes on each side of a meander are connected in series. The electrical connection between the individual partial electrodes on one side of the meander has an ohmic resistance which must not be too small. In the represented embodiment, the resistance is increased by lengthening the connection in a serpentine shape (7). The distance between adjacent partial electrode pairs (11) in the longitudinal direction is always the same. The distance between partial electrodes in the longitudinal direction is preferably several 10 μm. The smaller the distance between the partial electrode pairs in the longitudinal direction, the higher the resolution of the sensor; that is, the smaller the quantity of liquid that can be metered. The uncovered, active electrode regions can come into contact with a liquid inside the capillary. The leads to the bondpads situated outside the capillary are covered by a passivation layer (6).

Figure 3:
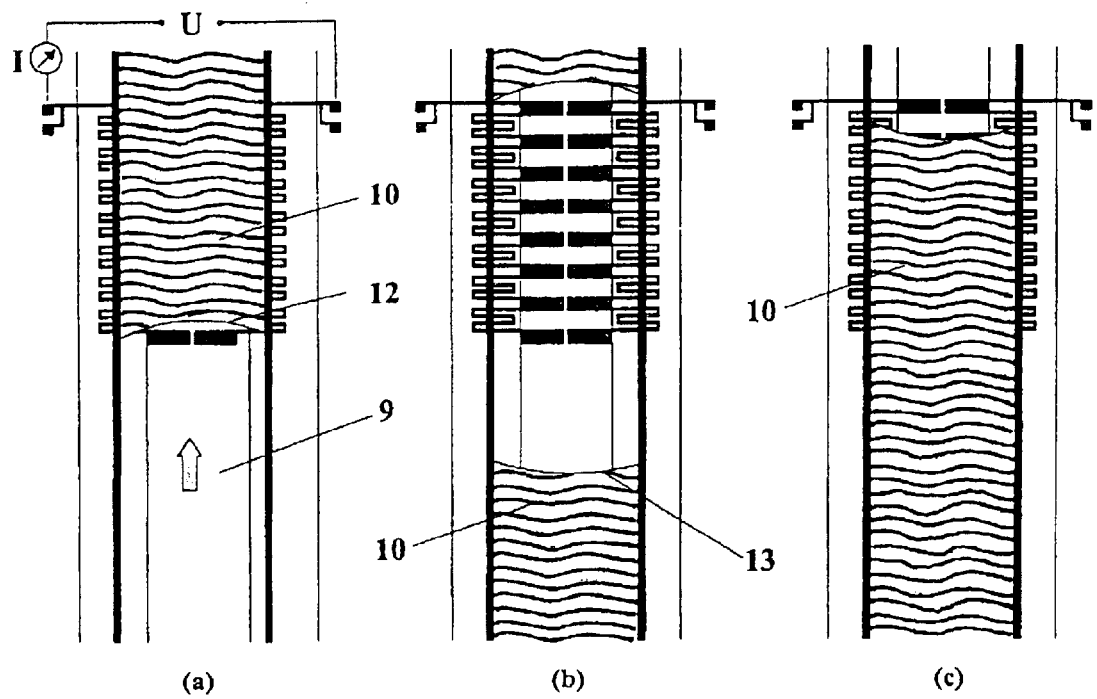
FIG. 3 shows how the movement of an air bubble (9) over the meander structure (8) successively covers the partial electrode pairs (11) of the meander and then exposes same.

FIG. 3 shows the movement of an air bubble (9) over a meander structure as the air bubble successively covers the individual partial electrode pairs (11) of the meander and then exposes same. A conductive liquid (10) encloses an air bubble, which moves upward on both sides (indicated by an arrow). As soon as the forward front (12) of the bubble uncovers the bottommost partial electrode pair (FIG. 3a), the current between the opposing electrodes of the meander drops. The current reaches a minimum when the bubble completely covers the meander (FIG. 3b) and then gradually increases again as the bubble migrates across the meander (FIG. 3c). The current reaches its initial value after the rear front (13) of the bubble has crossed the topmost partial electrode pair of the meander.

Figure 4:
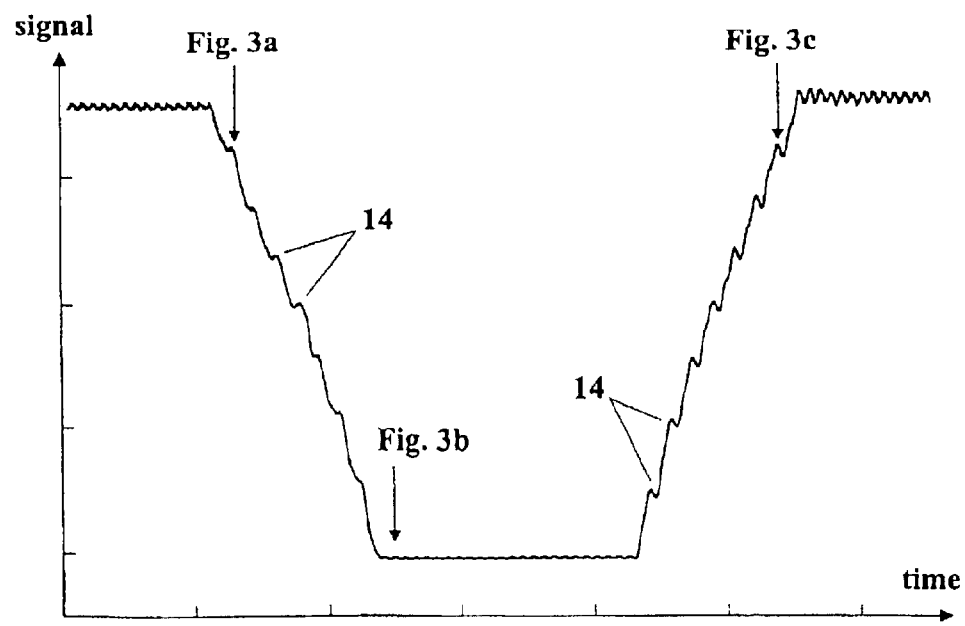
FIG. 4 shows a typical current curve resulting from the bubble-movement in FIG. 3 when a meander is supplied with alternating current.

FIG. 4 plots over time the curve of the amplified output signal (current) of a meander which has eight partial electrode pairs. The positions of the bubble in FIGS. 3a through 3c are assigned to the corresponding locations on the curve. Each time that the bubble front reaches another partial electrode pair, the wetted electrode area makes an abrupt change. As a result, the current curve likewise undergoes abrupt changes (jumps) (14). The degree of distinctiveness of these jumps depends on the wetting properties of the sensor surface between the electrodes. If the sensor surface is hydrophobic, the liquid film underneath the bubble immediately tears and the electrical contact between the oppositely situated partial electrodes is abruptly disconnected, creating a peak. If the chip surface is hydrophilic, a thin liquid film partially remains underneath the bubble. The peak fades and a plateau is formed. As the velocity of the bubble increases, tearing of the liquid film is retarded, especially at the forward front of the bubble. This results in smoothing of the output signal, with plateaus likewise being formed. The indeterminate tearing behavior of the liquid film underneath the bubble is responsible for the complex shape of the curve maximum with additional small peaks. With high bubble migration velocities, a hydrophilic surface, and a low measurement frequency, the jumps become increasingly difficult to detect. The jumps may be completely obliterated in the curve.

The shape of the signal is independent of the direction of motion of the bubble. For identical air bubbles, the curve resulting from upward motion as well as the curve resulting from downward motion may be reproduced as often as desired.

Figure 5:
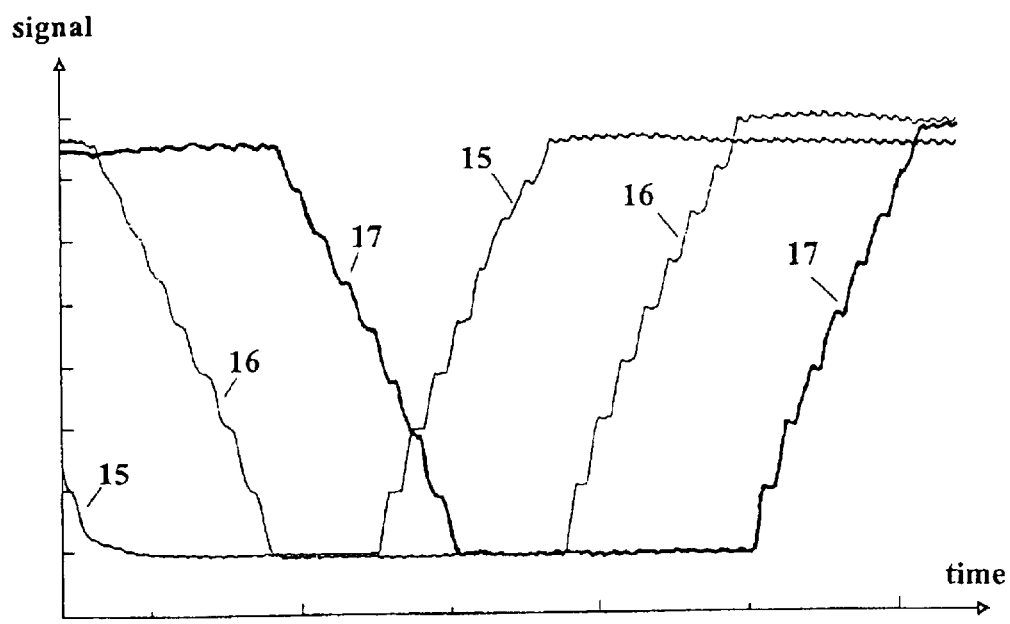
FIG. 5 shows a time plot of the current curves for three adjacent meanders as the result of movement of a bubble over the three meanders.

FIG. 5 represents a plot over time of the output signals, denoted by (15), (16), and (17), of three adjacent meanders during the movement of a bubble at constant velocity over the meanders. The measurement was made in parallel; that is, the output signals of the three meanders were recorded simultaneously. The figure illustrates the advantage of measuring the position of the bubble by detecting jumps in the current curve. Thus, the maximum absolute values, for example, of the meander output signals where there is complete liquid coverage need not be absolutely identical. In spite of different absolute values of the current, for example between curves 15 and 16, the position of the bubble can be precisely determined by counting.

What is claimed is:

1. A sensor element for electrically measuring the position of liquid levels, comprising:
    a substrate; and
    a plurality of electrodes adapted to be contacted individually and mounted on the substrate, wherein the electrodes comprise sensor-active partial electrodes that are networked with electrically connections, and wherein the partial electrodes of two respective electrodes are always positioned opposite one another, separated by a distance, to form partial electrode pairs, and the electrode pairs thus formed recur periodically over a length of the sensor element wherein the electrodes are essentially electrically insulated from each other.

2. The sensor element according to claim 1, wherein the electrically connections of the networked partial electrodes are coated with a passivating layer.

3. The sensor element according to claim 1, wherein the partial electrodes positioned pairwise opposite one another are always at least one of separated by the same distance, and the distances between the partial electrode pairs in the longitudinal direction of the sensor element are constant over the entire length of the sensor element, and the number of partial electrode pairs per electrode pair is constant.

4. The sensor element according to claim 1, wherein the substrate is made of one of silicon, glass, and plastic.

5. The sensor element according to claim 1, wherein the electrodes are made of one of platinum, iridium, and gold.

6. The sensor element according to claim 1, wherein the sensor chip surface has wetting properties such that the boundaries of the liquid wetting of the sensor surface correspond to the liquid level.

7. An arrangement for measuring a capillary filling, including a sensor element for electrically measuring the position of liquid levels, comprising
    a substrate; and
    a plurality of electrodes adapted to be contacted individually and mounted on the substrate,
    wherein the electrodes comprise sensor-active partial electrodes that are networked with electrically connections, and wherein the partial electrodes of two respective electrodes are always positioned opposite one another, separated by a distance, to form partial electrode pairs, and the electrode pairs thus formed recur periodically over a length of the sensor element, wherein the sensor element is attached to a capillary in such a way that the sensor-active partial electrodes are situated inside the capillary and the electrically connection options are situated outside the capillary, and that at least one conductivity boundary of the capillary filling is located in the region of the sensor element.

8. The arrangement according to claim 7, wherein two conductivity boundaries of operating liquids in the capillary form a bubble in the region of the sensor element, said bubble being bounded on both sides by the operating liquid.

9. The arrangement according to claim 8, wherein at least one of the bubble is filled with gas, the length of the bubble is approximately twice the length of an electrode pair in the longitudinal direction, and the same operating liquid is present on both sides of the bubble.

10. A method for measuring liquid levels using a sensor element for electrically measuring the position of liquid levels, comprising
    a substrate; and
    a plurality of electrodes adopted to be contacted individually and that are mounted on the substrate, wherein the electrodes comprise sensor-active partial electrodes that are networked with electrically connections, wherein the partial electrodes of two respective electrodes are always positioned opposite one another, separated by a distance, to form partial electrode pairs,
    and the electrode pairs thus formed recur periodically over a length of the sensor element comprising the steps of:
        determining which electrode pairs are covered and which are not covered by an operating liquid by measuring the resistance of each individual electrode pair in an idle state of the operating liquid;
        comparing the resistance values to characteristic minimum and maximum values for liquid coverage or no liquid coverage; and
        detecting from this information the position of the liquid level or of a bubble on a specific electrode pair wherein the electrodes are electrically insulated from each other.

11. A method for measuring liquid levels using a sensor element for electrically measuring the position of liquid levels, said sensor element including a substrate; and a plurality of electrodes adapted to be contacted individually and mounted on the substrate,
    wherein the electrodes comprise sensor-active partial electrodes that are networked with electrically connections, and wherein the partial electrodes of two respective electrodes are always positioned opposite one another, separated by a distance, to form partial electrode pairs,
    and the electrode pairs thus formed recur periodically over a length of the sensor element said method comprising the steps of:

comparing the intermediate value lying between the minimum and maximum resistance value of the electrode pair to a reference resistance curve of the electrode pair; and obtaining the position of a conductivity boundary for a specific partial electrode pair from said step of comparing, wherein the electrodes are electrically insulated from each other.

12. The method according to claim 10, wherein a path distance traveled by the bubble is determined from the detected position of the bubble or of the conductivity boundary before and after movement of the bubble.

13. A method for measuring liquid levels using a sensor element for electrically measuring the position of liquid levels, wherein the sensor element includes a substrate; and a plurality of electrodes adapted to be contacted individually and mounted on the substrate, wherein the electrodes comprise sensor-active partial electrodes that are networked with electrically connections, and wherein the partial electrodes of two respective electrodes are always positioned opposite one another, separated by a distance, to form partial electrode pairs, and the electrode pairs thus formed recur periodically over a length of the sensor element, said method comprising the steps of:

determining jumps in the resistance values upon movement of a bubble by parallel monitoring of the resistance values of all electrode pairs; and determining the path distance traveled by the bubble from the number of jumps.

14. The method according to claim 12, wherein a displaced liquid volume is determined from the path distance traveled.

15. The method according to claim 10, wherein the resistance measurement of the electrode pairs is performed by measuring a resulting current after an alternating current is applied to the electrodes.

16. The method according to claim 15, wherein the alternating current has a frequency in the kilohertz range and/or an amplitude in the range of 100 millivolts.

17. The method according to claim 13, wherein a displaced liquid volume is determined from the path distance traveled.

18. The method according to claim 11, wherein the resistance measurement of the electrode pairs is performed by measuring a resulting current after an alternating current is applied to the electrodes.

19. The method according to claim 12, wherein the resistance measurement of the electrode pairs is performed by measuring a resulting current after an alternating current is applied to the electrodes.

* * * * *